United States Patent
Conrads et al.

(10) Patent No.: US 11,300,108 B2
(45) Date of Patent: Apr. 12, 2022

(54) WIND TURBINE

(71) Applicant: PROMECON process measurement control GmbH, Barleben (DE)

(72) Inventors: Hans Georg Conrads, Hannover (DE); Matthias Maede, Eichenbarleben (DE)

(73) Assignee: PROMECON process measurement control GmbH, Barleben (DE)

(*) Notice: Subject to any disclaimer, the term of this patent is extended or adjusted under 35 U.S.C. 154(b) by 0 days.

(21) Appl. No.: 17/052,197

(22) PCT Filed: Apr. 26, 2019

(86) PCT No.: PCT/DE2019/000114
§ 371 (c)(1),
(2) Date: Nov. 1, 2020

(87) PCT Pub. No.: WO2019/210892
PCT Pub. Date: Nov. 7, 2019

(65) Prior Publication Data
US 2021/0363974 A1 Nov. 25, 2021

(30) Foreign Application Priority Data
May 3, 2018 (DE) .......................... 102018003608.2

(51) Int. Cl.
*F03D 17/00* (2016.01)
*F03D 7/02* (2006.01)
(Continued)

(52) U.S. Cl.
CPC ........... *F03D 17/00* (2016.05); *F03D 7/0204* (2013.01); *G01P 5/08* (2013.01); *G01P 5/20* (2013.01); *G01P 5/22* (2013.01); *G01P 13/045* (2013.01); *F05B 2270/32* (2013.01); *F05B 2270/321* (2013.01)

(58) Field of Classification Search
CPC .......... F03D 17/00; F03D 7/0204; G01P 5/08; G01P 5/20; G01P 5/22; G01P 13/045; F05B 2270/32; F05B 2270/321; Y02E 10/72
See application file for complete search history.

(56) References Cited

FOREIGN PATENT DOCUMENTS

EP 3361094 A1 * 8/2018 ............. F03D 17/00

* cited by examiner

*Primary Examiner* — Tulsidas C Patel
*Assistant Examiner* — Joseph Ortega
(74) *Attorney, Agent, or Firm* — Cohen & Hildebrand, PLLC (57) ABSTRACT

A wind turbine for generating electric energy including a tower equipped with rotatable nacelle with rotor which is rotatable about a horizontal rotational axis and which comprises an electric generator. The wind turbine additionally comprises a device for determining flow direction and speed of the wind and a device for or regulating the alignment of the rotor against the wind. The device for determining speed and flow direction comprises pair of receiving antennas, for obtaining electric signals using electrically influenced particles, molecules carried by the wind and are supplied to a correlation measurement device. Here, the time needed by the electrically influenced particles/molecules to traverse the distance between the receiving antennas of a pair of receiving antennas is determined. Subsequently, speed and flow direction of the wind are calculated in a computing device and are supplied to the device for controlling or regulating the alignment of the rotor.

19 Claims, 5 Drawing Sheets

(51) Int. Cl.
*G01P 13/04* (2006.01)
*G01P 5/08* (2006.01)
*G01P 5/20* (2006.01)
*G01P 5/22* (2006.01)

WIND TURBINE

This is an application filed under 35 USC § 371 of PCT/DE2019/000114, filed on Apr. 26, 2019, claiming priority to DE 10 2018 003 608.2, filed on May 03, 2018, each of which is herein incorporated by reference in its entirety.

BACKGROUND OF THE INVENTION

(1) Field of the Invention

The invention relates to a wind turbine, in particular for generating electrical energy from the wind incident on the rotor of the wind turbine.

A generic wind turbine has a substantially vertical tower, a nacelle which is arranged at the top of the tower and which can be rotated in a controlled or regulated manner about the longitudinal axis of the tower, a rotor rotatable about an essentially horizontally oriented axis of rotation with at least two rotor blades arranged on a hub, an electric generator operatively connected with the hub, at least one device for determining the speed and the direction of flow of the wind incident on the wind turbine and a control or regulating device at least for controlling or regulating the alignment of the rotor with respect to the wind incident on the wind turbine. The effectiveness of the wind turbine, i.e. its efficiency, depends to a large extent on the orientation of the rotor against the wind incident on the wind turbine. Modern wind turbines also have the option of changing the orientation of the axis of rotation of the rotatable rotor relative to the horizontal in a controlled or regulated manner in order to enable the rotor to be also aligned in directions of flow of the wind that deviate from the horizontal and to controllably change the position of the rotor blades and to thereby change the amount of energy recoverable from the incident wind by changing the wind load of the rotor blades commensurate with the speed of the incident wind. It is essential for the generation of electrical energy from the wind incident on the wind turbine, that the speed and the flow direction of the wind flowing onto the wind turbine are known with the greatest possible precision.

Cup anemometers arranged on the roof of the nacelle are widely used for determining the wind speed in wind turbines. To determine the wind direction, wind vanes are also arranged on the roof of the nacelle. However, arranging the components for determining the speed and the direction of flow of the wind on the roof of the nacelle is problematic and usually produces only inaccurate results, because the speed and direction of flow of the wind behind the rotor are measured and are influenced by the rotation of the rotor.

(2) Description of Related Art

EP 1 288 494 A1 discloses a wind vector determination device which can be arranged in front of the rotor of a wind turbine, i.e. on the hub, wherein the speed and the direction of flow of the incident wind is determined by using at least two pitot tubes having back-pressure openings with a different spatial orientation. This makes it possible to determine both the speed and the direction of flow of the wind. However, pitot tubes are highly susceptible to interference from dirt and/or icing. Protective measures against this are possible, but expensive. This can lead to inaccuracies in determining the speed and direction of flow of the incident wind.

Wind turbines are known which have ultrasonic anemometers to determine the speed and/or the direction of flow of the incident wind. For example, DE 10 2015 003 069 A1 describes an ultrasonic anemometer that can be arranged on a wind turbine to determine at least one property of the incident wind, which has at least one transmitter for emitting sound waves and at least two receivers for at least partially recording the emitted sound waves and an evaluation unit for determining the transit time of the sound waves between the transmitter and the at least two receivers and for determining therefrom the speed and/or the direction of flow of the incident wind. Ultrasonic anemometers disadvantageously always require calibration and are sensitive to contamination, wetting and icing.

EP 0 970 308 B1 discloses a wind turbine with a wind speed measuring system designed as a laser anemometry system, wherein a laser beam is emitted toward the incident wind, which interacts with particles carried in the incident wind. This interaction is detected and evaluated to generate a speed signal that corresponds to the speed of the particles. By sending the laser beam out in different directions toward the incident wind, a speed field of the incident wind can be determined. The disadvantage here is the high complexity of the laser anemometry system.

BRIEF SUMMARY OF THE INVENTION

It is the object of the invention to provide a wind turbine of the generic type with which a largely interference-insensitive alignment of the rotor of the wind turbine in relation to the incident wind is achieved with high accuracy.

This object is achieved according to the invention with a wind turbine having the features of claim 1 or 2. Claims 3 to 15 describe advantageous embodiments of the invention.

A wind turbine according to the invention includes at least one essentially vertical tower, a nacelle arranged at the top of the tower and rotatable in a controlled or regulated manner about the longitudinal axis of the tower with a rotor rotatable about an essentially horizontally oriented axis of rotation with at least two rotor blades arranged on a hub, an electrical generator operatively connected with the hub, at least one device for determining the direction of flow and at least one device for determining the speed and direction of flow of a wind incident on the wind turbine, and a control or regulating device at least for controlling or regulating the orientation of the rotor with respect to the wind incident on the wind turbine. In a first embodiment of the invention, the at least one device for determining the speed and the direction of flow of the wind incident on the wind turbine has at least four linear receiving antennas arranged on the hub so that the incident wind flows past these receiving antennas. The receiving antennas are designed in such a way that electrical signals are generated in the receiving antennas by electrostatic induction from electrically influenced particles and molecules carried along in the incident wind, which move past the receiving antennas. Each two of the receiving antennas form a corresponding pair of receiving antennas, which are arranged parallel to one another at a predetermined mutual distance, one behind the other, in relation to the axis of rotation of the rotor in such a way that at least some of the particles and molecules that move past the first receiving antenna in the direction of flow of the incident wind also move past the second receiving antenna in the direction of flow of the incident wind. The receiving antennas of at least one corresponding pair of the receiving antennas are arranged at an angle ai with $10° < \alpha_1 < 80°$, preferably $15° < \alpha_1 < 60°$, with respect to the axis of rotation of the rotor or to a plane spanned between the straight line disposed between pairs of receiving antennas and the axis of rotation of the rotor, and the receiving antennas of at least one further corresponding pair of receiving antennas are arranged at an angle $\alpha_2$ with $-10°>\alpha_2>-80°$, preferably $-15°>\alpha_2>-60°$, with respect to the axis of rotation of the rotor or to a plane which spanned by a straight line disposed between the pairs of receiving antennas and the axis of rotation of the rotor. The device for determining the speed and the direction of flow of the wind incident on the wind turbine further includes at least one correlation measuring device which is designed to determine by way of a correlation measurement the time that the electrically influenced particles and molecules carried along in the incident wind take to traverse the distance between the receiving antennas that form a corresponding pair of receiving antennas. The receiving antennas of a first corresponding pair of receiving antennas which are arranged at an angle $\alpha_1$, and the receiving antennas of a second corresponding pair of receiving antennas which are arranged at an angle $\alpha_2$ with respect to the rotational axis of the rotor or with respect to a plane of a straight line disposed between the pairs of the receiving antennas and the rotational axis of the rotor, are each connected to a respective input of a correlation measuring device, so that the times that the electrically influenced particles and molecules need to traverse the distance between the corresponding receiving antennas of the pair of receiving antennas can be determined by way of a correlation measurement. A receiving antenna or a plurality of receiving antennas can also be arranged such as to penetrate the plane which is spanned by a straight line disposed between the pair of receiving antennas and the axis of rotation of the rotor. Finally, at least one device for determining the speed and the direction of flow of the wind incident on the wind turbine includes a computing device for calculating the respective speed at which the electrically influenced particles and molecules move between the two receiving antennas of a pair of receiving antennas. The speed is calculated from the distance and the time needed by the electrically influenced particles and molecules carried in the incident wind to traverse the distance between the receiving antennas forming a corresponding pair of receiving antennas. The respective speed of the incident particles and molecules between the receiving antennas of a pair of receiving antennas corresponds to a directional component of the speed of the incident wind that is perpendicular to the parallel line-shaped receiving antennas of a corresponding pair of receiving antennas. The speed of the incident wind and the direction of flow of the incident wind with respect to the axis of rotation of the rotor are calculated by triangulation from the speeds of the directional components of the incident wind determined by the pairs of receiving antennas. The rotor can then be aligned with respect to the wind incident on the wind turbine based on the direction of flow of the incident wind, wherein the circular plane spanned by the rotor blades is advantageously aligned at right angles to the wind direction.

Advantageously, the wind turbine may furthermore have a device for at least roughly determining the flow direction of the wind incident on the wind turbine. This further device may be, for example, a wind vane, with which the direction of flow of the incident wind is determined and the rotor is aligned approximately with respect to the wind incident on the wind turbine. The direction of flow of the incident wind is then accurately determined with the above-described device.

If the wind turbine includes means for changing the position of the rotor blades, the speed of the incident wind can be used as a variable for controlling or regulating the position of the rotor blades.

In another embodiment of the invention, the wind turbine has a lance arranged at the tip of the hub in the axis of rotation of the rotor and pointing away from the hub. In this embodiment of the invention, the device for determining the speed and the direction of flow of the wind incident on the wind turbine has at least four linear receiving antennas arranged on the lance so that the incident wind flows past the receiving antennas. As already described, the receiving antennas are designed in such a way that electrical signals are generated in the receiving antennas by electrostatic induction from electrically influenced particles and molecules carried along in the incident wind moving past the receiving antennas. In this second embodiment of the invention, too, each two receiving antennas form a corresponding pair of receiving antennas and are arranged parallel to one another at a predetermined mutual distance, one behind the other in relation to the axis of rotation of the rotor in such a way that at least some of the antennas located in the direction of flow of the incident wind particles and molecules of the incident wind that move past the first receiving antenna also move past the second receiving antenna in the direction of flow of the incident wind. The receiving antennas of at least one corresponding pair of receiving antennas are arranged at an angle $\alpha_1$ with $10°<\alpha_1<80°$, preferably $15°<\alpha_1<60°$, with respect to the axis of rotation of the rotor, and the receiving antennas of at least one other corresponding pair of receiving antennas are arranged at an angle $\alpha_2$ with $-10°>\alpha_2>-80°$, preferably $-15°>\alpha_2>-60°$, with respect to the axis of rotation of the rotor. The device for determining the speed and the direction of flow of the wind incident on the wind turbine further includes at least one correlation measuring device and a computing device with the features already described for the first embodiment of the invention.

Preferably, receiving antennas forming a corresponding pair of receiving antennas are constructed as mutually parallel rods or wires. The receiving antennas preferably have a length between 100 mm and 1000 mm and have preferably the same length. The distance a between two receiving antennas forming a corresponding pair of receiving antennas is preferably between 100 mm≤a≤1000 mm. The receiving antennas are electrically insulated from one another and from the electrically conductive parts of the wind turbine.

When the receiving antennas are constructed as a rod or wire, one or more receiving antennas may advantageously be segmented electrically and optionally also mechanically in the longitudinal direction of the rod or wire, wherein the rod or wire segments forming a receiving antenna may be aligned with one another in the longitudinal direction of the segments. The segments of a receiving antenna may be electrically connected in series and the electrically segmented receiving antenna may be connected to an input of the correlation measuring device as a single electrical unit. However, each segment of an electrically segmented receiving antenna may also be electrically connected to a separate input of the correlation measuring device.

If a spinner is arranged on the hub of the rotor, a receiving antenna may be formed by a plurality of electrically interconnected rods or pins arranged in a line and protruding from the spinner. It will be understood that if a spinner is arranged on the hub of the rotor, all receiving antennas may be formed, as described above, by several electrically interconnected rods or needles arranged in a line and protruding from the spinner. If the spinner is composed of an electrically conductive material, the rods or needles are electrically insulated from the spinner.

In a particularly preferred embodiment of the invention, an electrode is arranged opposite to the direction of flow of the wind incident on the wind turbine, at a distance of 100 mm to 1500 mm, preferably about 200 mm, from the first receiving antenna in front of the first receiving antenna, based on the direction of flow of the wind flowing onto the wind turbine. The electrode has at least one electrode segment with an electrode contour having an average radius $r_m$ with 0.01 mm≤$r_m$≤1.2 mm. The electrode may have one or more tips or cutting edges with a contour with an average radius $r_m$ with 0.01 mm≤$r_m$≤1.2 mm or as a wire with an average radius $r_m$ with 0.1 mm≤$r_m$≤1.2 mm. The electrode is arranged so that at least part of the wind flowing around electrode segment with an electrode contour having an average radius $r_m$ with 0.01 mm≤$r_m$≤1.2 mm flows past the receiving antennas at a distance <500 mm. At least one electrically operating counter-electrode corresponding to this electrode is arranged or formed on the wind turbine. In this particularly preferred embodiment of the invention, the wind turbine includes a high voltage source with a voltage U having a magnitude of 12 kV≤|U|≤20 kV, preferably 15 kV≤|U|≤17 kV, which is connected with its different poles to the electrode and the counter-electrode.

The high-voltage source can be used to generate a continuous voltage U or to generate voltage pulses with maximum values of the voltage U between 12 kV≤|U|≤20 kV, preferably 15 kV≤|U|≤17 kV, and a pulse duration of approximately 1 ms. Random, non-periodic pulse trains or periodically recurring pulse trains can be useful. The periodically recurring pulse trains can, for example, have a number of n pulses with a voltage U and a pulse duration of approximately 1 ms, where 2≤n≤80, preferably 6≤n≤30. The pulse sequence of n pulses can be repeated periodically with a period duration between 0.2 s and 3.0 s, preferably between 1.0 s and 1.5 s.

By arranging an electrode opposite the direction of flow of the wind incident on the wind turbine in front of the receiving antennas and the formation of a counter-electrode, at least part of the incident wind is exposed to the action of an electrical voltage U. Air molecules and/or particles carried in the incident wind are ionized. In the case of a negatively charged electrode, free electrons can also be emitted by field emission and electrically interact with air molecules and/or particles carried in the incident wind. The resulting positive and negative charge carriers are driven by the effect of the electric field $\vec{E}$ built up between the electrode and the counter-electrode. The charge carriers, whose electrical charge has the same sign as the electrode, move from the electrode towards the counter-electrode. The charge carriers, driven by the electric field $\vec{E}$, interact with molecules carried in the incident wind, which are thereby electrically influenced, so that when the electrically influenced molecules of the incident wind flow past the receiving antennas, electrical signals are generated by electrostatic induction in the receiving antennas which are then, as described above, supplied to a correlation measurement device.

The counter-electrode can be specially designed and arranged, and can be formed, for example, by an electrically conductive plate which is arranged in the vicinity of the receiving antennas. However, it can also be formed by an electrically conductive component of the wind turbine, for example the hub of the rotor, or, if present, by the lance arranged on the hub or, if present, by the spinner, if the spinner is made of an electrically conductive material, or by a another electrically conductive component of the wind turbine. It is important for the arrangement and design of the electrode and the counter-electrode that the electric field $\vec{E}$ in the region of the receiving antennas has an electrical field strength <3 V/m. The electrode and counter-electrode are each connected to a pole of the high voltage source. Preferably, the electrode is connected as a cathode and the counter-electrode is connected to ground potential.

The electrode is preferably designed as at least one rod protruding from the spinner or as at least one needle protruding from the spinner. The electrode designed as a rod or needle has at least one electrode segment with an electrode contour with a mean radius $r_m$ with 0.01 mm<$r_m$<1.2 mm. The electrode designed as a rod or needle can have one or more tips or cutting edges with a contour with a mean radius rm with 0.01 mm<$r_m$<1.2 mm.

The electrode can optionally be designed as a single piece or as several pieces.

The particular advantage of arranging in front of the receiving antennas an electrode carrying a voltage in the wind incident on the wind turbine opposite the direction of flow of the incident wind and of arranging or forming a counter-electrode is that, if the incident wind is only slightly loaded with electrically influenced particles or molecules or under special weather conditions, such as fog, rain, snow, etc., in the incident wind, a sufficient number of electrically influenced molecules is generated in the wind flowing onto the wind turbine, which when flowing past the receiving antennas generate in the receiving antennas through electrostatic induction electrical signals, which are then supplied to a correlation measuring device.

If the receiving antennas and the possibly arranged electrode are rigidly connected to the rotatable rotor, the wind turbine may furthermore have a rotation angle detection device for detecting the rotation angle of the rotatable rotor. The rotation angle detection device can be operatively connected to the computing device. The angle of rotation of the rotatable rotor can be included in the calculation of the direction of flow of the incident wind. Instead of the rotation angle detection device for detecting the angle of rotation of the rotatable rotor, a device for detecting at least one freely selectable point rotating with the rotor about the axis of rotation of the rotor can also be provided. This device for detecting at least one freely selectable point rotating with the rotor about the axis of rotation of the rotor can also be operatively connected to the computing device. The output signals from this device for detecting at least one freely selectable point that rotates with the rotor around the axis of rotation of the rotor, which signal the periodic return of at least one freely selectable point that rotates around the axis of rotation of the rotor, can be used in the calculation of the direction of flow of the incident flow in the wind.

If the receiving antennas are arranged on the rotor or spinner of the wind turbine, the receiving antennas can be designed as foil strips of electrically conductive material that are glued to the rotor or spinner in an electrically insulated manner.

BRIEF DESCRIPTION OF THE DRAWINGS

The invention will now be explained in more detail below with reference to two exemplary embodiments. The appended drawings show in FIG. 1: a first embodiment of a wind turbine with a lance arranged at the tip of the hub and disposed in the axis of rotation of the rotor, FIG. 2: as a detail, the lance with an electrode and receiving antennas arranged on the tip of the hub and disposed in the axis of rotation of the rotor, FIG. 3: a second embodiment of a wind turbine with receiving antennas arranged on a spinner, FIG. 4 the receiving antennas arranged on the spinner in detail, FIG. 5 another variant of the second embodiment of a wind turbine with receiving antennas arranged in the wall of a spinner, FIG. 6 the receiving antennas arranged in the wall of a spinner in detail, FIG. 7 a section of a wall of a spinner with receiving antennas and counter-electrode arranged therein, FIG. 8 a cross-section of a wall of a spinner with arranged receiving antennas and counter-electrode.

DETAILED DESCRIPTION OF THE INVENTION

Figures 1, 2:
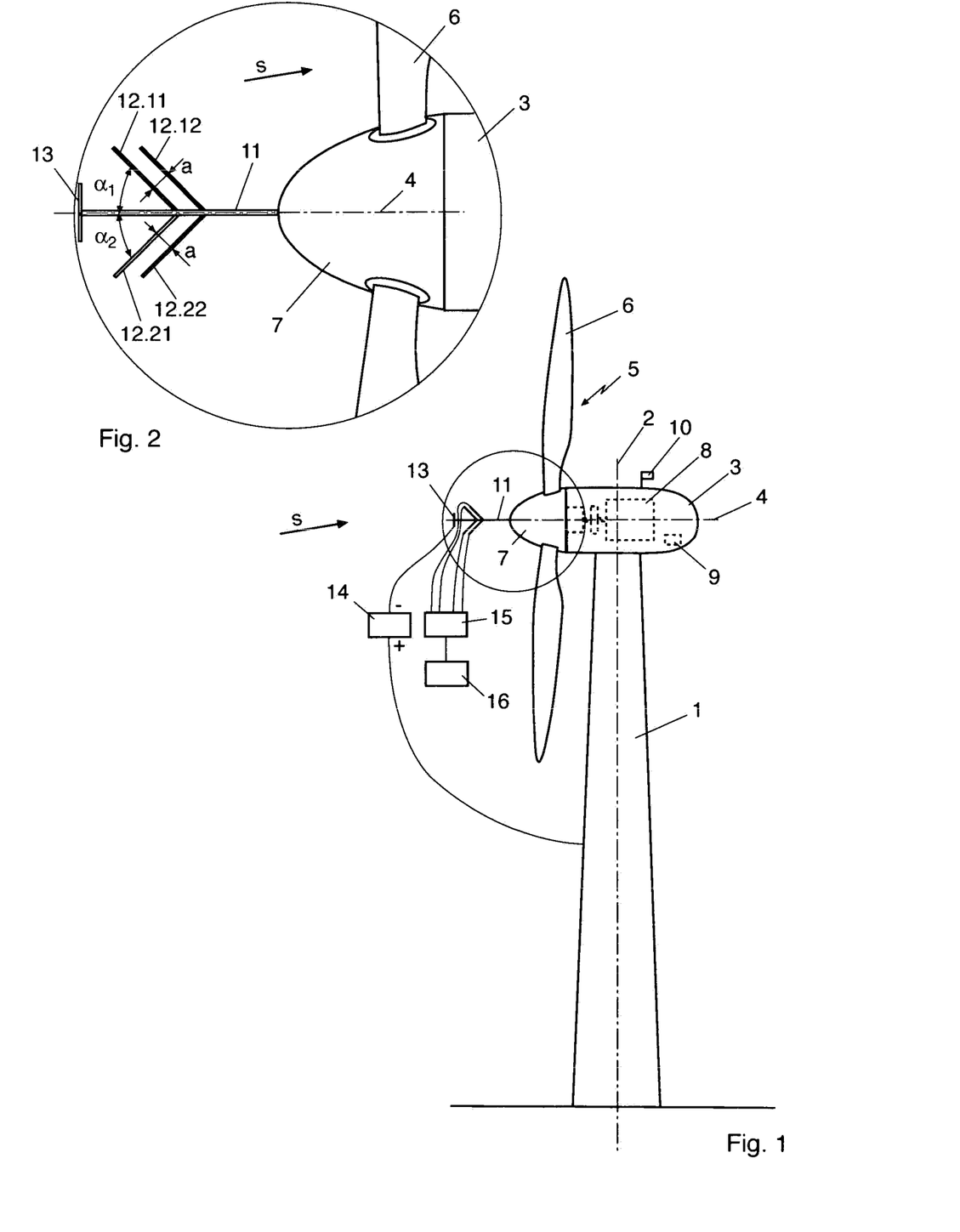

FIG. 1 shows a first embodiment of a wind turbine with a substantially vertical tower 1, a nacelle 3 arranged at the top of the tower 1 and controllable for rotation about the longitudinal axis 2 of the tower 1. A rotor 5 having three rotor blades 6 arranged on a hub for rotation about a substantially horizontally oriented axis of rotation 4 is arranged on the nacelle 3. The hub carries as a casing a spinner 7 and is therefore not visible. An electrical generator 8 arranged in the nacelle 3 is operatively connected with the hub. The wind turbine further includes a control or regulating device 9 for controlling or regulating the alignment of the rotor 5 with respect to the wind incident on the wind turbine and a device designed as a wind vane 10 to determine the direction of flow s of the wind incident on the wind turbine. Finally, the wind turbine includes a device for determining the speed v and the direction of flow s of the wind incident on the wind turbine. The device for determining the speed v and the direction of flow s of the wind incident on the wind turbine consists of four receiving antennas 12,11, 12.12, 12.21 and 12.22 arranged on a lance 11, an electrode 13 arranged at the tip of the lance 11, a high-voltage source 14, a correlation measuring device 15 and a computing device 16.

The lance 11 is arranged on the hub and, as shown in FIG. 2, protrudes from the tip of the spinner 7. It is located in the axis of rotation 4 of the rotor 5. At the lance 11, the four receiving antennas 12.11, 12.12, 12.21 and 12.22 are electrically insulated against each other and against the lance 11. In each case two receiving antennas 12.11, 12.12 or 12.21, 12.22, respectively, are arranged parallel to one another with a distance a therebetween and thus form a first and a second corresponding pair of receiving antennas 12.11-12.12, 12.21-12.22. The first pair of receiving antennas 12.11-12.12 is arranged at the lance 11 at an angle $\alpha_1$ of 40° with respect to the axis of rotation 4 of the rotor 5, and the second pair of receiving antennas 12.21-12.22 is arranged at an angle $\alpha_2$ of −40° with respect to the axis of rotation 4 of the rotor 5. The magnitude of the angles $\alpha_1$ and $\alpha_2$ can, but do not have to be, identical. Each receiving antenna 12.11, 12.12, 12.21, 12.22 is electrically connected to one respective input of the correlation measuring device 15. The receiving antennas 12.11, 12.12, 12.21, and 12.22 are rod-shaped and have a length of approximately 1000 mm. An electrode 13 is arranged at the tip of the lance 11 at a distance of approximately 200 mm from the first receiving antennas 12.11 and 12.21 in the direction of flow s of the incident wind. The two ends of the electrode 13 are designed in the shape of blades with a radius $r_m$ of the blade of 0.8 mm. The electrode 13 is electrically insulated with respect to the lance 11 and is electrically connected to the negative pole of the high-voltage source 14. The positive pole of the high voltage source 14 is electrically connected to the tower 1.

The method is used to determine the speed v and the direction of flow s of the incident wind. The high voltage source 14 provides an electric voltage U of −17 kV which is applied to the electrode 13. At least part of the incident wind is exposed to the effect of this electrical voltage U of −17 kV. This voltage can be directly ionize air molecules and/or particles carried in the incident wind. In addition, the electrode 13 can emit free electrons by way of field emission or electrons can be released from molecules or particles carried in the incident wind by field ionization and electrically interact with air molecules and/or particles carried in the incident wind. This creates electrical charge carriers, which in turn interact with molecules carried in the incident wind and affect them electrically. When the electrically affected molecules of the incident wind 12 flow past at the receiving antennas 12.11, 12.12, 12.21 and 12.22, electrical signals can be produced through electrostatic induction in the receiving antennas 12.11, 12.12, 12.21 and 12.22. The time t needed by the electrically influenced molecules of the incident wind to traverse the distance a between the receiving antennas 12.12 and 12.12 and 12.21 and 12.22, respectively, of a corresponding pair of receiving antennas 12.11-12.12, and 12.21-12.22 is determined from the electrical signals of the pairs of receiving antennas 12.11-12.12 and 12.21-12.22 by a correlation measurement. Two speeds $v_1$ and $v_2$ are then calculated by the computing device 16 from the distance a between the receiving antennas 12.12 and 12.12, and 12.21 to 12.22, respectively, of a corresponding pair of receiving antennas 12.11-12:12 or 12.21-12.22, and the times $t_1$ and $t_2$ needed by the electrically influenced molecules of the incident wind to traverse this distance a, which each correspond to the directional components of the speed v of the incident wind that is perpendicular to the parallel rod-shaped receiving antennas 12.11 and 12.12 or 12.21 and 12.22, respectively, of a corresponding pair of receiving antennas 12.11-12:12 or 12.21-12.22. The speed v of the incident wind and the flow direction s of the incident wind are calculated from the speeds $v_1$ and $v_2$ of the directional components of the speed v of the incident wind by triangulation. FIG. 6a illustrates the speeds $v_1$ and $v_2$ of the directional components of the speed v of the incident wind. The speed v and the flow direction s of the incident wind are supplied to the control or regulating device 9. The alignment of the rotor R with respect to the wind incident on the wind turbine is then controlled or regulated by the control or regulating device 9.

Figures 3, 4:
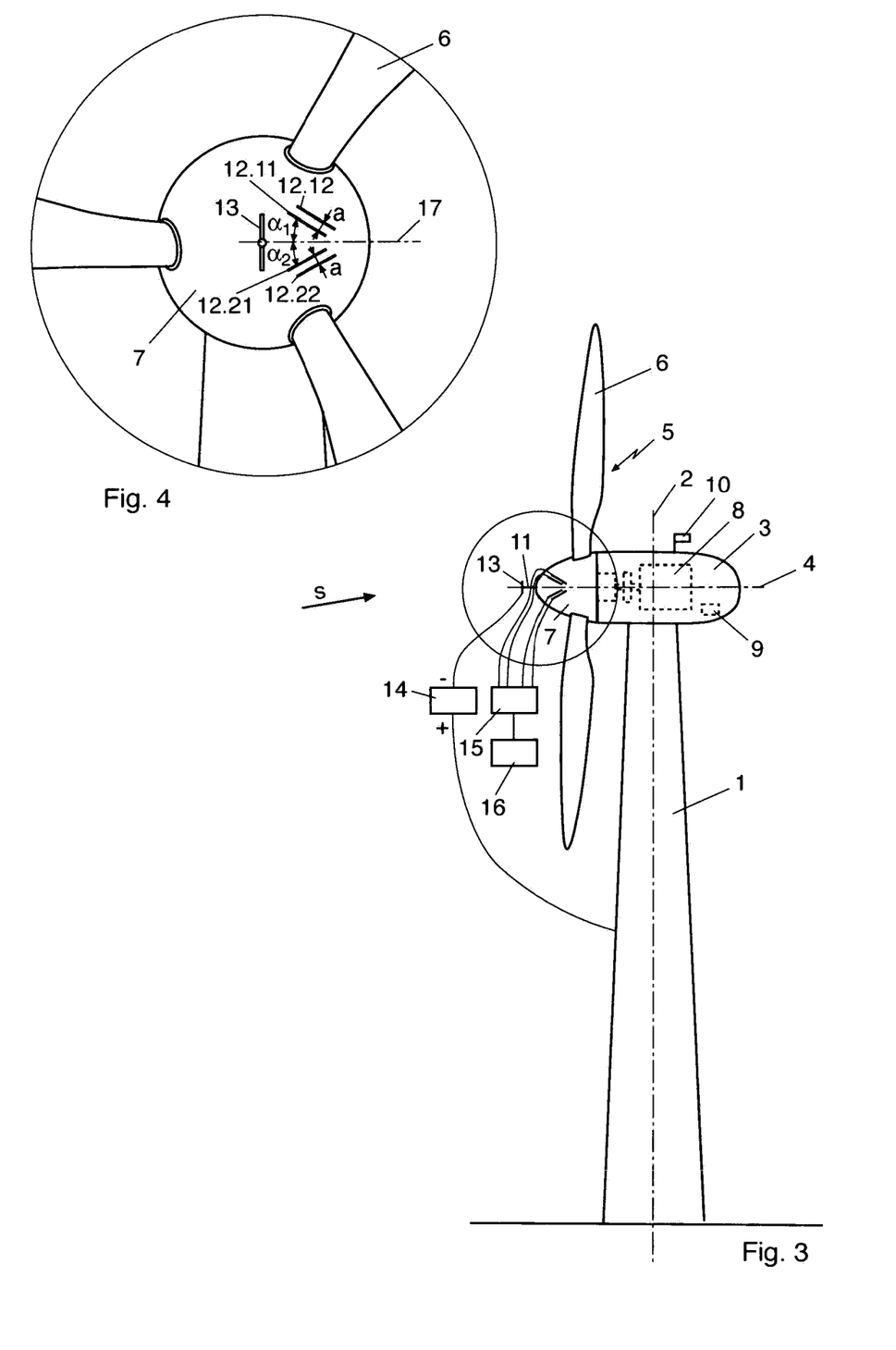

FIGS. 3 and 4 show a second embodiment of the wind machine of the invention. In contrast to the first embodiment shown in FIGS. 1 and 2, the receiving antennas 12.11, 12.12, 12.21 and 12.22 in this second embodiment are not arranged on a lance 11 protruding from the tip of the spinner 7, but instead directly on the spinner 7. Arranged on the spinner 7 are four rod-shaped receiving antennas 12.11, 12.12, 12.21 and 12.22, which are electrically insulated from one another and from the spinner 7. In each case, two receiving antennas 12.11, 12.12, and 12.21 and 12.22, respectively, are arranged parallel to one another with a mutual distance a therebetween and thus form a first and a second corresponding pair of receiving antennas 12.11-12:12 and 12:21-12:22. The first receive antenna pair 12.11-12.12 is arranged at an angle $\alpha_1$ of 40° with respect to a plane spanned by a straight line 17 between the pairs of receiving antennas 12.11-12:12 and 12:21-12:22 and the axis of rotation 4 of the rotor 5. The second pair of receiving antennas 12.21-12.22 is arranged on the spinner 7 at an angle $\alpha_2$ of −40° with respect to the aforementioned plane. Each receiving antenna 12.11, 12.12, 12.21 and 12.22 is electrically connected to a corresponding input of the correlation measuring device 15. An electrode 13 is arranged on a lance 11 protruding from the tip of the spinner 7 at a distance of approximately 200 mm from the first receiving antennas 12.11 and 12.21 in the direction of flow s of the incident wind. The two ends of the electrode 13 are designed in the shape of blades with a radius $r_m$ of the blade of 0.8 mm. The electrode 13 is electrically insulated from the lance 11 and is electrically connected to the negative pole of the high-voltage source 14. All other features of the second embodiment of the wind turbine correspond to those previously described for the first embodiment.

Figures 5, 6, 7, 8:
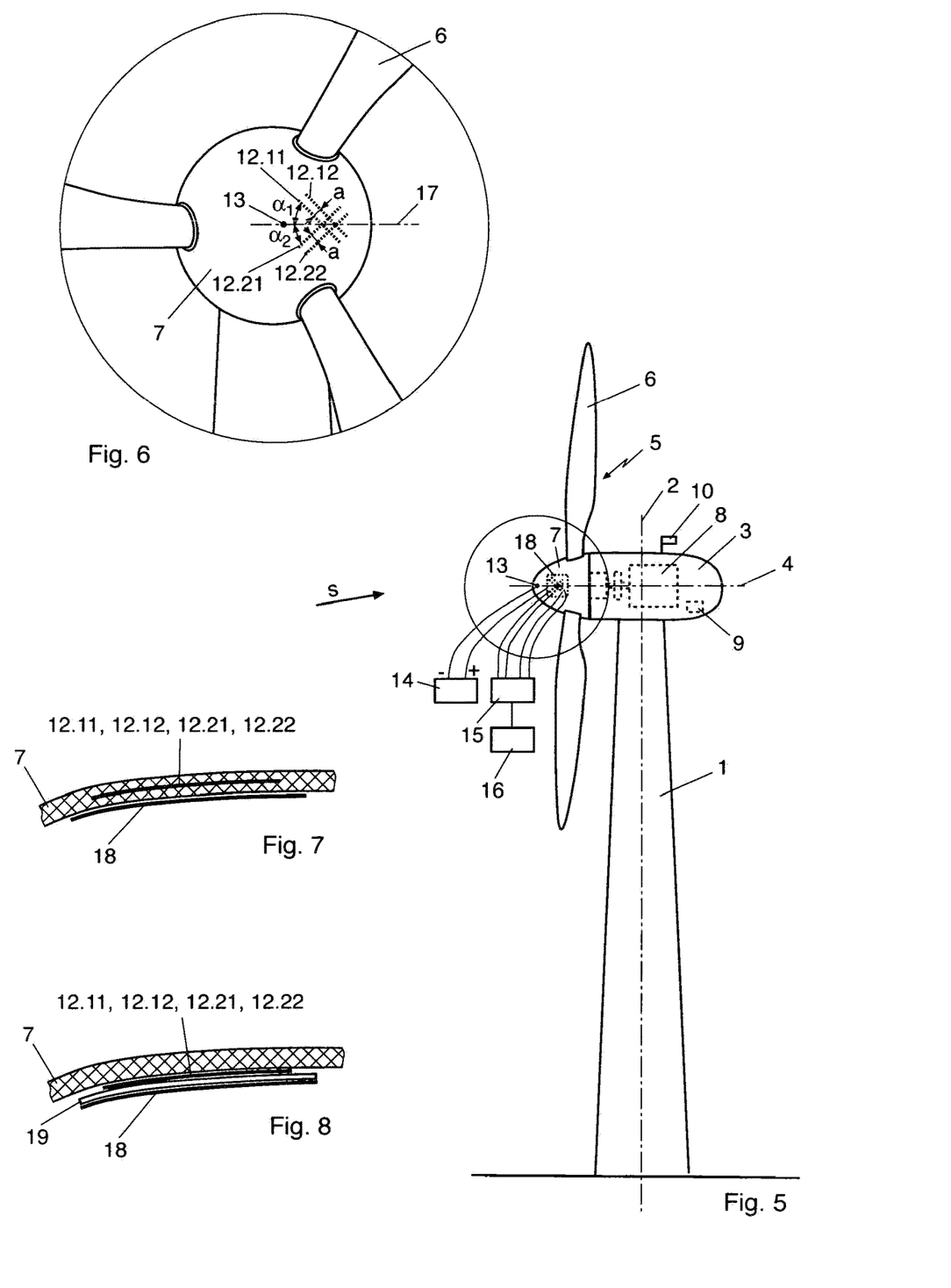

FIGS. 5 and 6 show another variant of the second embodiment of the wind turbine according to the invention. In this variant of the second embodiment of the wind turbine according to the invention, the spinner 7 is made of glass-fiber-reinforced plastic, i.e. of a material having a dielectric effect. The receiving antennas 12.11, 12.12, 12.21 and 12.22 are arranged inside the wall of the spinner 7, i.e. inside the dielectrically acting material. A total of four rod-shaped receiving antennas 12.11, 12.12, 12.21 and 12.22 are arranged which are electrically isolated from one another and from all other parts of the wind turbine. Each of two receiving antennas 12.11, 12.12, 12.21 and 12.22 are arranged parallel to one another with a mutual distance a therebetween and thus form a first and a second corresponding pair of receiving antennas 12.11-12:12 and 12:21-12:22. A first pair of receiving antennas 12.11-12:12 is arranged at an angle ai of 60° with respect to a plane spanned by a straight line 17 between the pairs of receiving antennas 12.11, 12.12, and 12.21 and 12.22 and the axis of rotation 4 of the rotor 5, and a second pair of receiving antennas 12.21-12.22 is arranged at an angle $\alpha_2$ of −60° with respect to the aforementioned plane. The receiving antennas 12.11, 12.12 of the first pair of receiving antennas 12.11-12:12 intersect the receiving antennas 12.21, 12.22 of the second pair of receiving antennas 12.21-12:22. Each receiving antenna 12.11, 12.12, 12.21 and 12.22 is electrically connected to a corresponding input of the correlation measuring device 15. An electrode 13 protruding from the spinner 7 is arranged at a distance of approximately 200 mm from the first receiving antennas 12.11, 12.21 in the direction of flow s of the incident wind. The electrode 13 is rod-shaped and protrudes approximately 10 cm from the spinner skin. The electrode 13 has at the end protruding from the spinner 7 a tip with a radius $r_m$ of 0.8 mm. The electrode 13 is arranged in an electrically insulated manner and is electrically connected to the negative pole of the high voltage source 14. A counter-electrode 18 formed as a plate is disposed on the inside of the wall of the spinner 7 and is constructed and arranged so as to cover the area of the wall of the spinner 7, in which the receiving antennas 12.11, 12.12, 12.21 and 12.22 are arranged. The counter-electrode 18 is electrically insulated from the receiving antennas 12.11, 12.12, 12.21 and 12.22 and is electrically connected to the positive pole of the high voltage source 14. All further features of the other variant of the second embodiment of the wind turbine shown in FIGS. 5 and 6 correspond to those previously described for the first embodiment.

FIG. 7 shows a cross-section through the wall of a spinner 7 with receiving antennas 12.11, 12.12, 12.21 and 12.22 arranged within the wall and a counter-electrode 18 arranged on the inner side of the wall of the spinner 7.

FIG. 8 shows a cross-section through the wall of a spinner 7 with receiving antennas 12.11, 12.12, 12.21 and 12.22 arranged on the inside of the wall of the spinner 7. The counter-electrode 18 is also arranged on the inside of the wall of the spinner 7 and is separated from the receiving antennas 12.11, 12.12, 12.21 and 12.22 by an electrical insulation.

FIGS. 7 and 8 show possible exemplary arrangements of receiving antennas 12.11, 12.12, 12.21 and 12.22 and of the counter-electrode 18. Other additional arrangements of receiving antennas 12.11, 12.12, 12.21 and 12.22 and of the counter-electrode 18 inside the wall of a spinner 7 are possible and may be technically advantageous.

Figure 9:
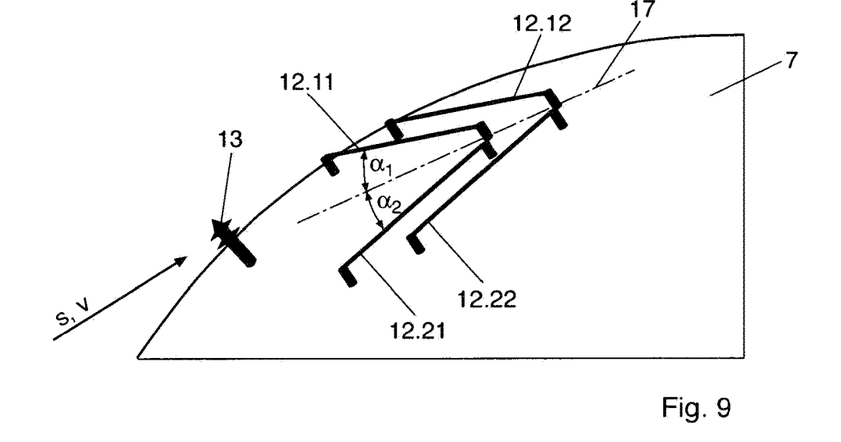
FIG. 9: a cross-section of a spinner with an electrode and receiving antennas arranged on the spinner.

FIG. 9 shows a detail of the surface of a spinner 7, illustrating the arrangement of four rod-shaped receiving antennas 12.11, 12.12, 12.21 and 12.22 on the spinner 7. The receiving antennas 12.11, 12.12, 12.21 and 12.22 are arranged on the spinner 7 and electrically insulated from one another and from the spinner 7. Each two receiving antennas 12.11, 12.12, 12.21 and 12.22 are arranged parallel to one another with a mutual distance a therebetween and thus form a first and a second corresponding pair of receiving antennas 12.11-12:12 and 12:21-12:22. The first pair of receiving antennas 12.11-12:12 is arranged at an angle ai of 30° with respect to a plane spanned by a straight lines 17 between the pairs of receiving antennas 12.11-12:12 and 12:21-12:22 and the axis of rotation 4 of the rotor 5. The second pair of receiving antennas 12:21-12:22 is arranged on the spinner 7 at an angle $\alpha_2$ of −30° with respect to the aforementioned plane. Each receiving antenna 12.11, 12.12, 12.21 and 12.22 is electrically connected to a corresponding input of the correlation measuring device 15. An electrode 13 is disposed on the spinner in the flow direction s of the incident wind at a distance of approximately 200 mm from the first receiving antennas 12.11 and 12.21. The electrode 13 protrudes from the spinner surface and has several tips with a radius $r_m$ of 0.8 mm. The electrode 13 is electrically insulated from the spinner 7 and is electrically connected to the negative pole of the high voltage source 14.

Figure 10A:
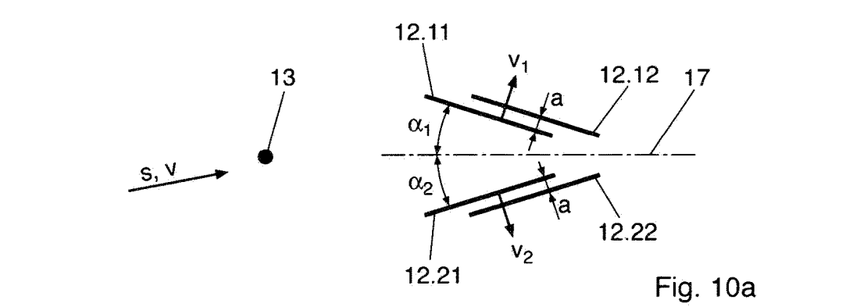
FIGS. 10a-e: plan views onto an electrode arranged on the spinner and onto receiving antennas arranged on the spinner.
Figure 10B:
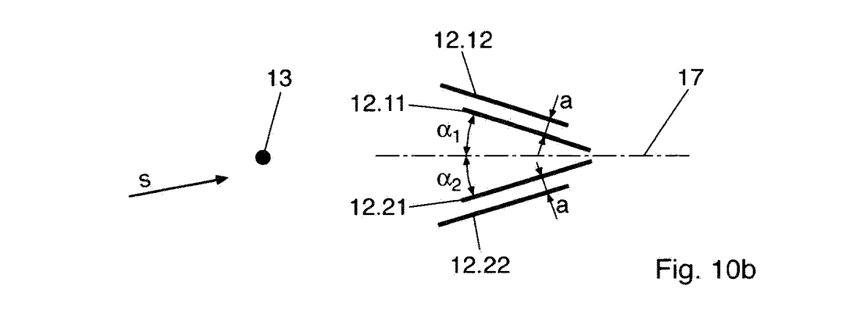
Figure 10C:
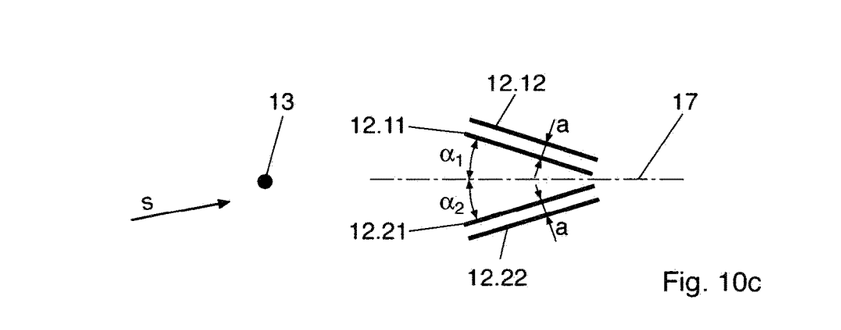
Figure 10D:
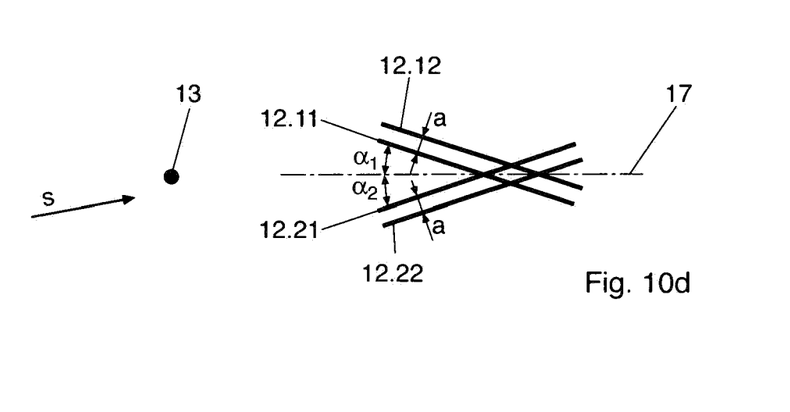

FIGS. 10a to d each show in form of a plan view on the surface of the spinner 7 further arrangements of receiving antennas 12.11, 12.12, 12.21 and 12.22 on the spinner 7. FIG. 10a shows a plan view of the arrangement already shown in FIG. 9. In the arrangements shown in FIGS. 10a and b, the receiving antennas 12.11, 12.12, 12.21 and 12.22 forming a pair of receiving antennas are 12.11-12.12 and 12.21-12:22, respectively, are shifted relative to each other in the longitudinal direction of the receiving antennas 12.11, 12.12, 12.21 and 12.22. This can be advantageous for achieving improved electrical signals at the receiving antennas 12.11, 12.12, 12.21 and 12.22. FIG. 10c shows an arrangement of the receiving antennas 12.11, 12.12, 12.21 and 12.22 wherein the receiving antennas 12.11, 12.12, 12.21 and 12.22 forming pairs of receiving antennas 12.11-12.12 and 12:21-12:22 have identical length and are not shifted relative to each other in the longitudinal direction of the receiving antennas 12.11, 12.12, 12.21 and 12.22. FIG. 10d shows an arrangement of the receiving antennas 12.11, 12.12, 12.21 and 12.22 wherein the receiving antennas 12.11, 12.12 of the first receive antenna pair 12.11-12.12 cross the receiving antennas 12.21, 12.22 of the second pair of receiving antennas 12:21-12:22. In the arrangement shown in FIG. 10d, all receiving antennas 12.11, 12.12, 12.21 and 12.22 are also electrically insulated from one another. An electrode 13 is arranged on the spinner 13 in the flow direction s of the incident wind at a distance of approximately 200 mm from the first receiving antennas 12.11 and 12.21.

Figure 10E:
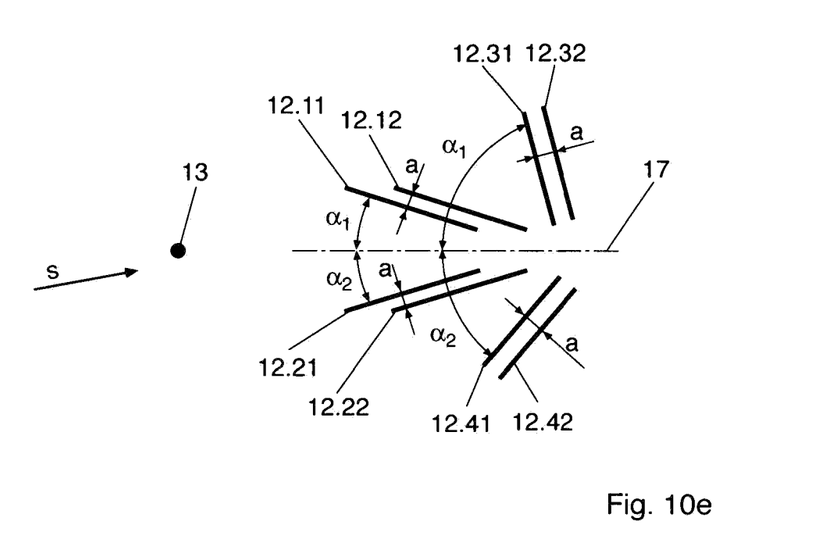

FIG. 10e shows a plan view on the surface of the spinner 7, wherein a total of eight receiving antennas 12.11, 12.12, 12.21, 12.22, 12.31, 12.32 and 12.41, 12.42 are arranged on the spinner. Each of two mutually parallel receiving antennas 12.11, 12.12, 12.21, 12.22, 12.31, 12.32 and 12.41, 12.42 form a pair of receiving antennas 12.11-12.12, 12.21-12.22, 12.31-12.32 and 12.41-12.42. The pairs of receiving antennas 12.11-12.12 and 12.31-12.32 are arranged at an angle $\alpha_1$ with respect to a plane spanned between straight lines 17 disposed between the pairs the receiving antennas 12.11-12.12, 12.31-12.32, and 12.21-12.22 and 12.41-12.42 and the axis of rotation 4 of the rotor 5. The pair of receiving antennas 12.21-12.22 and 12.41-12.42 are arranged at an angle α2 with respect to this plane. In this case, the angle $\alpha_1$, at which the pair of receiving antennas 12.11-12.12 is arranged with respect to this plane, is 30°. The pair of receiving antennas 12.31-12.32 is arranged at an angle $\alpha_1$ of 75° with respect to this plane. The angle α2 at which the pair of receiving antennas 12.12-12.22 is arranged in relation to this plane is −30°. The pair of receiving antennas 12.41-12.42 is arranged at an angle $\alpha_2$ of −60° with respect to this plane. For determining the flow direction s and the speed v of the incident wind, one pair of receiving antennas 12.11-12.12 or 12.31-12.32 that is arranged at an angle ai with respect to this plane, and one pair of receiving antennas 12.21-12.22 or 12.41-12.42, and that is arranged at an angle $\alpha_2$ with respect to this plane, are electrically connected to the inputs of the correlation measuring device 15. Of course, it is conceivable and possible to operate multiple correlation measuring devices 15 in parallel and to connect respective corresponding pairs of receiving antennas 12.11-12.12 or 12.31-12.32, and 12.21-12.22 or 12.41-12.42, respectively, to the inputs of a correlation measuring device 15. For the arrangement illustrated in FIG. 10e, it would be conceivable to electrically connect each of the pairs of receiving antennas 12.11-12.12 and 12.21-12.22, 12.11-12.12 and 12.41-12.42, 12.31-12.32 and 12.21-12.22, as well as 12.31-12.32 and 12.41-12.42 to a correlation measuring device and to thus determine the flow direction s and the speed v of the incident wind by using four combinations of electrical signals generated at the receiving antennas. An improvement in the accuracy of the determination of the direction of flow s and the speed v of the incident wind and, as a result, the alignment of the rotor 5 with respect to the wind incident on the wind turbine can thus be achieved.

LIST OF REFERENCE SYMBOLS 1 tower
2 longitudinal axis of the tower
3 nacelle
4 axis of rotation of the rotor
5 rotor
6 rotor blades
7 spinner
8 electric generator
9 control or regulating device
10 wind vane
11 lance
12 receiving antennas
13 electrode
14 high voltage source
15 correlation measuring device
16 computing device
17 straight line
18 counter-electrode
19 electrical insulation
a distance between the corresponding receiving antennas of a pair of receiving antennas
s flow direction of the incident wind
t, $t_1$, $t_2$ time
v speed of the incident wind
$v_1$, $v_2$ directional components of the speed v of the incident wind
$\alpha_1$, $\alpha_2$ angle

The invention claimed is:

1. A wind turbine comprising: a substantially vertical tower (1), a nacelle (3) arranged at a top of the tower (1) and rotatable about a longitudinal axis (2) of the tower (1) in a controlled or regulated manner, a rotor (5) rotatable about a substantially horizontally aligned axis of rotation (4) having at least two rotor blades (6) arranged on a hub, an electrical generator (8) operatively connected to the hub, at least one device (10) for determining flow direction (s) and at least one device for determining speed (v) and the flow direction (s) of wind incident on the wind turbine, and a control or regulating device (9) at least for controlling or regulating alignment of the rotor (5) with respect to the wind incident on the wind turbine, wherein at least one device for determining the speed (v) and the flow direction (s) of the wind incident on the wind turbine comprises:

at least four rectilinear receiving antennas (12.11, 12.12, 12.21, 12.22, . . . 12.N1, 12.N2) arranged to the hub, wherein N is a positive integer, that the incident wind flows past the receiving antennas (12.11, 12.12, 12.21, 12.22, . . . 12.N1, 12.N2), and that the receiving antennas (12.11, 12.12, 12.21, 12.22, . . . 12.N1, 12.N2) are designed such that electrical signals are generated by electrostatic induction in the receiving antennas (12.11, 12.12, 12.21, 12.22, . . . 12.N1, 12.N2) by particles and molecules that are electrically influenced and carried in the incident wind and that move past the receiving antennas (12.11, 12.12, 12.21, 12.22, . . . 12.N1, 12.N2), with each two of the receiving antennas (12.11, 12.12, 12.21, 12.22, . . . 12.N1, 12. N2) forming a corresponding pair of receiving antennas ((12.11-12: 12), (12:21-12:22) . . . (12.N1-12.N2)), wherein the receiving antennas (12.11, 12.12, 12.21, 12.22, . . . 12.N1, 12.N2) of a corresponding pair of receiving antennas ((12.11-12:12), (12:21-12:22) . . . (12.N1-12.N2)) are arranged in parallel at a predetermined distance (a) with respect to one another and in relation to the axis of rotation (4) of the rotor (5) one behind the other in such a way that at least part of the particles and molecules of the incident wind flow direction (s) of the incident wind moving past the first receiving antenna (12.11, 12.21, . . . 12.N1) of a corresponding pair of receiving antennas ((12.11-12.12), (12.21-12.22) . . . (12.N1-12.N2)) moves also past the second receiving antenna (12.11, 12.21, . . . 12.N1) of the corresponding pair of receiving antennas ((12.11-12.12), (12.21-12.22) . . . (12.N1-12.N2)), and the receiving antennas (12.11, 12.12, . . . 12.N1, 12.N2) of at least one corresponding pair of receiving antennas ((12.11 - 12.12), . . . (12.N1 - 12.N2)) are arranged at an angle $\alpha_1$ with $10° < \alpha_1 < 80°$, with respect to the axis of rotation (4) of the rotor (5) or with respect to a plane spanned by a straight line (17) disposed between the pairs of receiving antennas ((12.11-12.12), (12.21-12.22) ... (12.N1-12.N2)) and the axis of rotation (4) of the rotor (5), or with respect to a plane spanned by a straight line (17) disposed between the receiving antennas (12.21, 12.22, ... 12.N1, 12.N2) of at least one other corresponding pair of receiving antennas ((12.21-12.22), ... (12.N1-12.N2)) at an angle $\alpha_2$ with $-10° > \alpha_2 > -80°$, with respect to the axis of rotation (4) of the rotor (5) or with respect to a plane spanned between the pairs of receiving antennas ((12.11-12.12), (12.21-12.22) ... (12.N1-12.N2)) and the axis of rotation (4) of the rotor (5), at least one correlation measuring device (15) which is designed to determine by a correlation measurement time (t) needed by the electrically influenced particles and molecules carried in the incident wind to traverse the distance (a) between the receiving antennas (12.11, 12.12, 12.21, 12.22, ... 12.N1, 12.N2) forming a corresponding pair of receiving antennas ((12.11 - 12.12), (12.21-12.22) ... (12.N1-12.N2)), wherein the receiving antennas (12.11, 12.12, ... 12.N1, 12.N2) of a first corresponding pair of receiving antennas ((12.11-12.12) ... (12.N1-12.N2)), which are arranged at an angle $\alpha_1$, and the receiving antennas (12.21, 12.22 ... 12.(N+1)1, 12.(N+1)2) of a second corresponding pair of receiving antennas ((12.21-12.22) ... (12.(N+1)1-12.(N+1)2)), which is arranged at an angle $\alpha_2$ with respect to the axis of rotation (4) of the rotor (5) or with respect to a plane spanned by a straight line (17) disposed between the pairs of receiving antennas ((12.11-12.12), (12.21-12.22) ... (12.N1-12.N2)) and the axis of rotation (4) of the rotor (5), are each connected to an input of a correlation measuring device (15), and a computing device (16) for calculating a respective speed $(v_1 \ldots v_n)$ from the distance (a) and time (t), which the electrically influenced particles and molecules carried in the incident wind need to traverse the distance (a) between the receiving antennas (12.11, 12:12, 12.21, 12.22 ... 12.N1, 12.N2) forming a corresponding pair of receiving antennas ((12.11-12.12), (12.21-12.22) ... (12.N1-12.N2)), wherein the respective speed $(v_1 \ldots v_n)$ is a directional component of the speed (v) of the incident wind that is perpendicular to the rectilinear receiving antennas (12.11, 12:12, 12.21, 12.22 ... 12.N1, 12.N2) of a corresponding pair of receiving antennas ((12.11-12.12), (12.21-12.22) ... (12.N1-12.N2)) and the speed (v) of the incident wind and the flow direction (s) of the incident wind is computed from the speeds $(v_1 \ldots v_n)$ of the directional components of the incident wind.

2. The wind turbine according to claim 1, wherein the receiving antennas (12.11, 12:12, 12.21, 12.22 ... 12.N1, 12.N2), which form a corresponding pair of receiving antennas ((12.11-12.12), (12.21-12.22) ... (12.N1-12.N2)) are constructed as mutually parallel rods or wires.

3. The wind turbine according to claim 1, further comprising a spinner (7) is arranged on the hub, and the receiving antennas (12.11, 12:12, 12.21, 12.22 ... 12.N1, 12.N2) are arranged on a wall of the spinner (7).

4. The wind turbine according to claim 3, wherein the spinner (7) constructed of a dielectrically acting material is arranged on the hub, with the receiving antennas (12.11, 12.12, 12.21, 12.22 ... 12.N1, 12.N2) arranged inside the wall of the spinner (7) or on an inner side of the wall of the spinner (7).

5. The wind turbine according to claim 1, wherein
a spinner (7) is arranged on the hub, and a receiving antenna (12.11, 12:12, 12.21, 12.22 ... 12.N1, 12.N2) is formed in each case by a plurality of electrically interconnected needles arranged in a line and protruding from the spinner (7).

6. The wind turbine according to claim 1, further comprising
at least one electrode (13) having at least one electrode segment with an electrode contour having an average radius $r_m$ with $0.01 \text{ mm} \leq r_m \leq 1.2 \text{ mm}$, and arranged with respect to a first receiving antenna (12.11, 12.21 ... 12.N1) in opposition of the flow direction (s) of the wind incident on the wind turbine with respect to the axis of rotation (4) of the rotor (5) and with respect to the direction of flow (s) of the wind incident on the wind turbine at a distance of 100 mm to 1500 mm, with respect to the flow direction (s) of the wind incident on the wind turbine in front of the first receiving antenna (12.11, 12.21 ... 12.N1) such that at least part of the wind flowing around the electrode segment having an electrode contour with an average radius $r_m$ with $0.01 \text{ mm} \leq r_m \leq 1.2 \text{ mm}$ thereafter flows past the receiving antennas (12.11, 12:12, 12.21, 12.22 ... 12.N1, 12.N2) at the distance of <500 mm, at least one counter-electrode (18) is formed which operates electrically relative to the electrode (13), and the wind turbine comprises a high voltage source (14) with a voltage U having a magnitude of $12 \text{ kV} \leq |U| \leq 20 \text{ kV}$, with the electrode (13) and the counter-electrode (18) being connected the different poles of the high voltage source (14).

7. The wind turbine according to claim 6, further comprising
an electrically conductive spinner (7) arranged on the hub and the spinner (7) is electrically connected with respect to the electrode (13) as a counter-electrode (18), that is electrically connected to a pole of the high voltage source (14).

8. The wind turbine according to claim 6, wherein the electrode (13) is connected as a cathode and the counter-electrode (18) is connected to ground potential.

9. The wind turbine according to claims 6, wherein the electrode (13) is constructed as at least one rod protruding from a spinner (7) or as at least one needle protruding from the spinner (7).

10. The wind turbine according to claims 6, wherein the electrode (13) has one or more tips or cutting edges with a contour having an average radius $r_m$ with $0.01 \text{ mm} \leq r_m \leq 1.2 \text{ mm}$ or is constructed as a wire having an average radius $r_m$ with $0.1 \text{ mm} \leq r_m 1, 2 \text{ mm}$.

11. The wind turbine according to claim 7, wherein the least one electrode (13) is arranged with respect to the first receiving antenna (12.11, 12.21 ... 12.N1) in opposition of the flow direction (s) of the wind incident on the wind turbine with respect to the axis of rotation (4) of the rotor (5) and with respect to the direction of flow (s) of the wind incident on the wind turbine at a distance of approximately 200 mm.

12. The wind turbine according to claim 6, wherein the voltage U of the high voltage source (14) has a magnitude of $15 \text{ kV} \leq |U| \leq 17 \text{ kV}$.

13. The wind turbine according to claims 6, wherein the wind turbine has an electrically conductive hub and the hub is connected electrically with respect to the electrode (13) as a counter-electrode (18), that is electrically connected to a pole of the high voltage source (14).

14. The wind turbine according to claims 1, wherein the receiving antennas (12.11, 12:12, 12.21, 12.22 ... 12.N1, 12.N2) are rigidly connected to the rotatable rotor (5) and a rotation angle detection device is provided detecting the angle of rotation of the rotatable rotor (5), and the rotation angle detection device is operatively connected to the computing device (16) and the rotation angle of the rotatable rotor (5) is included in the calculation of the direction of the incident wind.

15. The wind turbine according to claims 1, wherein the receiving antennas (12.11, 12:12, 12.21, 12.22 ... 12.N1, 12.N2) are rigidly connected to the rotatable rotor (5) and a device for detecting at least one point rotating with the rotor (5) around the axis of rotation (4) of the rotor (5) is provided, and the device for detecting at least one point rotating with the rotor (5) about the axis of rotation (4) of the rotor (5) is operatively connected to the computing device (16) and the output signals from the device for detecting at least one point that rotates with the rotor (5) about the axis of rotation (4) of the rotor (5) is included in the calculation of the direction of the incident wind.

16. The wind turbine according to claim 1, wherein the angle $\alpha_1$ is $15°<\alpha_1<60°$; while the angle $\alpha_2$ is $-15°>\alpha_2>-60°$.

17. A wind turbine comprising: a substantially vertical tower (1), a nacelle (3) arranged at a top of the tower (1) and rotatable about a longitudinal axis (2) of the tower (1) in a controlled or regulated manner, a rotor (5) rotatable about a substantially horizontally aligned axis of rotation (4) having at least two rotor blades (6) arranged on a hub, an electrical generator (8) operatively connected to the hub, a lance (11) arranged at a tip of the hub in the axis of rotation (4) of the rotor (5) and pointing away from the hub, at least one device (10) for determining flow direction (s) and at least one device for determining speed (v) and the flow direction (s) of wind incident on the wind turbine, and a control or regulating device (9) at least for controlling or regulating alignment of the rotor (5) with respect to the wind incident on the wind turbine, wherein at least one device for determining the speed (v) and the flow direction (s) of the wind incident on the wind turbine comprises:

at least four linear receiving antennas (12.11, 12.12, 12.21, 12.22, ... 12.N1, 12.N2) arranged to the lance (11), wherein N is a positive integer, that the incident wind flows past the receiving antennas (12.11, 12.12, 12.21, 12.22, ... 12.N1, 12.N2), and that the receiving antennas (12.11, 12.12, 12.21, 12.22, ... 12.N1, 12.N2) are designed such that electrical signals are generated by electrostatic induction in the receiving antennas (12.11, 12.12, 12.21, 12.22, ... 12.N1, 12.N2) by particles and molecules that are electrically influenced and carried in the incident wind and that move past the receiving antennas (12.11, 12.12, 12.21, 12.22, ... 12.N1, 12.N2), with each two of the receiving antennas (12.11, 12.12, 12.21, 12.22, ... 12.N1, 12.N2) forming a corresponding pair of receiving antennas ((12.11-12:12), (12:21-12:22) ... (12.N1-12.N2)), wherein the receiving antennas (12.11, 12.12, 12.21, 12.22, ... 12.N1, 12.N2) of a corresponding pair of receiving antennas ((12.11-12:12), (12:21-12:22) ... (12.N1-12.N2)) are arranged in parallel at a predetermined distance (a) with respect to one another and in relation to the axis of rotation (4) of the rotor (5) one behind the other in such a way that at least part of the particles and molecules of the incident wind flow direction (s) of the incident wind moving past the first receiving antenna (12.11, 12.21, ... 12.N1) of a corresponding pair of receiving antennas ((12.11-12.12), (12.21-12.22) ... (12.N1-12.N2)) moves also past the second receiving antenna (12.12, 12.22, ... 12.N2) of the corresponding pair of receiving antennas ((12.11-12.12), (12.21-12.22) ... (12. N1-12.N2)), and the receiving antennas (12.11, 12.12, ... 12.N1, 12.N2) of at least one corresponding pair of receiving antennas ((12.11-12.12), ... (12.N1-12.N2)) are arranged at an angle ai with $10°<\alpha_1<80°$, with respect to the axis of rotation (4) of the rotor (5), and the receiving antennas (12.21, 12.22, ... 12.N1, 12.N2) of at least one other corresponding pair of receiving antennas ((12.21-12.22), ... (12.N1-12.N2)) are arranged at an angle $\alpha_2$ with $-10°>\alpha_2>-80°$, with respect to the axis of rotation (4) of the rotor (5), at least one correlation measuring device (15) which is designed to determine by a correlation measurement time (t) needed by the electrically influenced particles and molecules carried in the incident wind to traverse the distance (a) between the receiving antennas (12.11, 12.12, 12.21, 12.22, ... 12.N1, 12.N2) forming a corresponding pair of receiving antennas ((12.11-12.12), (12.21-12.22) ... (12.N1-12.N2)), wherein the receiving antennas (12.11, 12.12, ... 12.N1, 12.N2) of a first corresponding pair of receiving antennas ((12.11-12.12) ... (12.N1-12.N2)), which are arranged at an angle $\alpha_1$, and the receiving antennas (12.21, 12.22 ... 12.(N+1)1-12.(N+1)2) of a second corresponding pair of receiving antennas ((12.21-12.22) ... (12.(N+1)1-12.(N+1)2)), which is arranged at an angle $\alpha_2$ with respect to the axis of rotation (4) of the rotor (5), are each connected to an input of a correlation measuring device (15), and a computing device (16) for calculating a respective speed $(v_1 \ldots v_n)$ from the distance (a) and time (t), which the electrically influenced particles and molecules carried in the incident wind need to traverse the distance (a) between the receiving antennas (12.11, 12:12, 12.21, 12.22 ... 12.N1, 12.N2) forming a corresponding pair of receiving antennas ((12.11-12.12), (12.21-12.22) ... (12.N1-12.N2)), wherein the respective speed $(v_1 \ldots v_n)$ is a directional component of the speed (v) of the incident wind that is perpendicular to the linear receiving antennas (12.11, 12:12, 12.21, 12.22 ... 12.N1, 12.N2) of a corresponding pair of receiving antennas ((12.11-12.12), (12.21-12.22) ... (12.N1-12.N2)) and the speed (v) of the incident wind and the flow
direction (s) of the incident wind in relation to the axis of rotation (4) is computed from the speeds $(v_1 \ldots v_n)$ of the directional components of the incident wind.

18. The wind turbine according to claims 17, wherein the electrically conductive lance (11) is arranged on the hub and the lance (11) is electrically connected with respect to the electrode (13) as a counter-electrode (18), that is electrically connected to a pole of the high-voltage source (14).

19. The wind turbine according to claim 2, wherein the angle ai is $15°<\alpha_1<60°$; while the angle $\alpha_2$ is $-15°>\alpha_2>-60°$.

* * * * *

UNITED STATES PATENT AND TRADEMARK OFFICE
CERTIFICATE OF CORRECTION

PATENT NO. : 11,300,108 B2
APPLICATION NO. : 17/052197
DATED : April 12, 2022
INVENTOR(S) : Conrads et al.

It is certified that error appears in the above-identified patent and that said Letters Patent is hereby corrected as shown below:

In the Claims

Column 15, Line 7, replace "claims" with --claim--;
Column 15, Line 16, replace "claims" with --claim--;
Column 15, Line 20, replace "around" with --about--;
Column 16, Line 15, replace "ai" with --$\alpha 1$--;
Column 16, Line 65, replace "2" with --17--.

Signed and Sealed this
Thirty-first Day of May, 2022

Katherine Kelly Vidal
*Director of the United States Patent and Trademark Office*